United States Patent [19]

Hamisch et al.

[11] 4,383,434

[45] May 17, 1983

[54] MAGNETOSTRICTIVE ENGINE-KNOCK SENSOR

[75] Inventors: Hans-Joachim Hamisch; Manfred Boruschewitz; Theodor Gast, all of Berlin, Fed. Rep. of Germany

[73] Assignee: Robert Bosch GmbH, Stuttgart, Fed. Rep. of Germany

[21] Appl. No.: 241,513

[22] Filed: Mar. 9, 1981

[51] Int. Cl.³ .............................................. G01L 23/22
[52] U.S. Cl. ............................................ 73/35; 73/651
[58] Field of Search .............. 73/35, 517 R, 651, 654; 310/26; 335/215

[56] References Cited

U.S. PATENT DOCUMENTS

| | | | |
|---|---|---|---|
| 2,521,401 | 9/1950 | Ohman et al. | 73/651 X |
| 2,542,075 | 2/1951 | Firth | 310/26 |
| 2,619,605 | 11/1952 | Lancor | 73/35 X |
| 3,174,130 | 3/1965 | Woollett | 310/26 X |
| 4,275,586 | 6/1981 | Gast et al. | 73/35 |

*Primary Examiner*—James J. Gill
*Attorney, Agent, or Firm*—Frishauf, Holtz, Goodman & Woodward

[57] ABSTRACT

A flexure vibrator clamped at one end and oriented in a direction perpendicular to the direction of oscillations produced at its clamped end mounting by knocks in an engine to which the sensor is affixed, is provided with a magnetostrictive body which generates electrical signals in response to vibrations of the vibrator. The vibrator may be made of magnetostrictive material and its upper and lower halves may be of opposite polarity, a result that may be obtained by folding over a strip of magnetic material on itself at one end or the other. A vibrating body of material that is not magnetostrictive may have a magnetostrictive body associated with it. If the magnetostrictive material has no remanence, a magnetic bias may be applied by an additional coil or by a permanent magnet. Sensitivity is improved if damping signals in phase opposition to the vibration-produced signals are applied from the time that the knock signals die away until the next engine spark, with damping applied to one diagonal of a bridge of which the detector coil is one arm and the detected signal being taken off from the other diagonal of the bridge.

10 Claims, 7 Drawing Figures

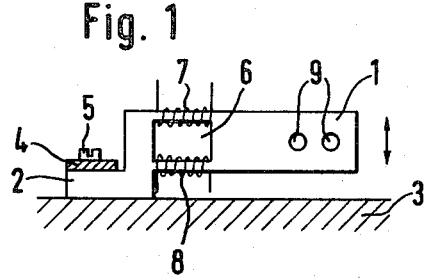
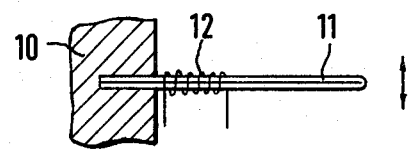
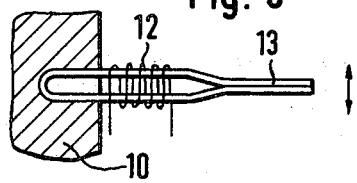
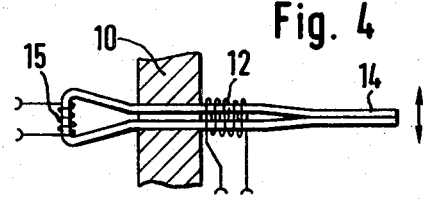
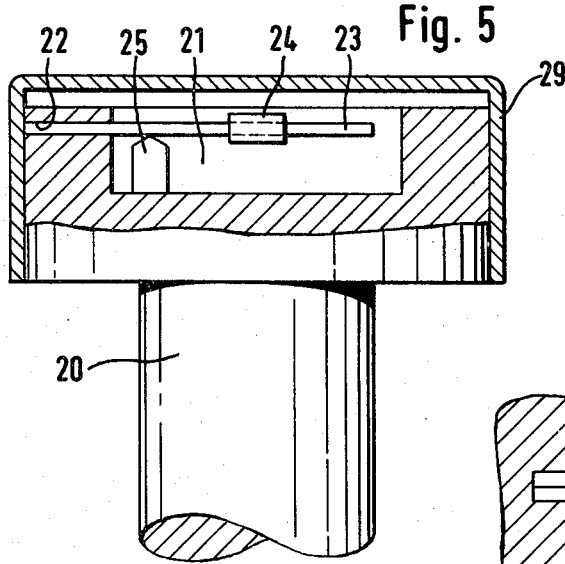
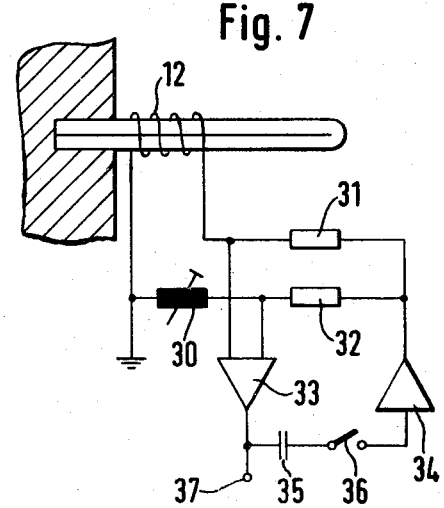
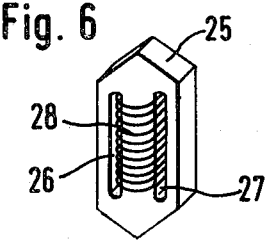

MAGNETOSTRICTIVE ENGINE-KNOCK SENSOR

The invention concerns a sensor for detecting the occurrence of knocks in a cylinder of an internal combustion engine, and particularly a sensor of the kind utilizing a flexure vibration element responsive to engine-knock oscillations to influence an electric detection circuit.

It is known that a so-called knock occurs under particular operating conditions in Otto engines, a class of engine that includes the conventional four-stroke internal combustion engines. These knocks are sonic frequency vibrations of the compressed fuel-air mixture that are produced by a shock wave. During those oscillations, the heat transfer to the piston and cylinder walls is greatly increased. This produces a damaging thermal overload on these surfaces, so that engine knocks are basically to be avoided. Since it is nevertheless desired to utilize, as far as possible, the existing versatility of the mode of operation, there is interest in a sensor that provides a knock warning early and reliably.

It is already known, from German patent publication DE-OS No. 28 01 969, which corresponds to allowed U.S. patent application Ser. No. 600,038, filed Jan. 16, 1979, to use a vibrating flexure member for the measuring of the knocking of an Otto engine. As the vibrating member, held at one end in the manner of a vibrating reed, a piezoelectric element was there proposed. An improved type of piezoelectric sensor is disclosed in our copending U.S. patent application Ser. No. 236,907 filed Feb. 23, 1981 (attorney docket 80604/W, claiming priority of German patent application No. P 30 08 780.0), using a resilient reed clamped at one end as a flexure vibration element and a piezoelectric element at the clamped reed end, which is stressed by the reed motion.

Piezoelectric materials have the property of being very brittle and therefore break easily. That leads to high rejection rates and mass production and to a high sensitivity to shock in operation. In the case of hard knocks or shocks, there is the risk of breakage of the piezoelectric vibrator.

THE INVENTION

It is an object of the invention to provide for an engine-knock sensor which is not subject to the disadvantages of piezoelectric sensors.

Briefly, a flexure vibration member clamped at one end mounted on a part of the engine is used which comprises a magnetostrictive element encircled by a coil that is connected in circuit for detection of engine-knock vibrations. The vibration member may be an elongated body made of magnetostrictive resilient material. Another resilient material may be used, however, in association with a magnetostrictive element in contact therewith near the clamped end of the body and encircled by a pick-up coil.

In particular, two regions are provided in the plane of vibration of the body that are oppositely polarized. The signal induced in the coil is then particularly great. The two regions can easily be obtained by folding of a magnetostrictive sheet or strip.

Since, in a manner analogous to the case of the piezoelectric effect, a reciprocal magnetostrictive effect exists—length changes in the vibrator can be produced by an applied magnetic field—there is the possibility of controlled damping of the vibrator, preferably electronically, by periodically applying negative feedback, preferably coupled through a bridge circuit.

For selective tuning of the flexure vibrator to a particular knock frequency, it is useful to provide a weight that is shiftable along the vibrator strip or rod or to provide the latter with bores, according to whether the resonance frequency needs to be lowered or raised. It is particularly useful to house the flexure vibrator in a cavity of the screw head of a cylinder head screw, since these are easily interchangeable and can also be replaced in older motors.

The advantages of the sensor of the present invention is that magnetostrictive material is relatively easy to work with in manufacture and is insensitive to shock. The provision of the entire vibrating member out of magnetostrictive material also has the advantage of simplicity and economy.

THE DRAWINGS

The invention is further described by way of illustrative example with reference to the annexed drawings, in which:

FIGS. 1–4 are schematic side views, partly in section, of different embodiments of the sensor of the invention;

FIG. 5 is a side view, mostly in section, of still another embodiment of sensor according to the invention which is built into a cylinder head screw;

FIG. 6 is a detail of the embodiment of FIG. 5 combined with a diagram of a part of the sensor of FIG. 5, and FIG. 7 is a diagram of a circuit for damping a flexure vibrator.

DESCRIPTION OF THE ILLUSTRATED EMBODIMENTS

FIG. 1 illustrates a molded or otherwise shaped body 1 of magnetostrictive material serving as a flexure vibration member fastened to a part 3 of an internal combustion engine that transmits engine-knock noises causing it to oscillate slightly up and down. The fastening is provided by a clamp plate 4 and a screw 5. The body 1 serving as the flexure vibrator is so mounted that its long dimension is directed perpendicularly to the direction in which the part 3 of the engine oscillates in response to engine knocks. A rectangular aperture 6 is provided in the body 1 near the place of mounting and, on the legs forming the long walls of the aperture, coils 7 and 8 are wound. The resonance frequency and bandwidth of the system is tunable by bores 9. The system illustrated in FIG. 1 vibrates in the plane of the drawing.

As the result of the magnetostrictive effect, opposed voltages are induced in coils 7 and 8, since one leg is compressed and the other expanded by a swinging movement of the body during vibration. The subtraction of the mutually opposed voltages respectively produced by the coils provide the desired signal. This arrangement is particularly useful if the upper and lower sides of the vibrating body are not or cannot be polarized with opposite polarity. Nickel, permalloy or ferroxcube materials are particularly suitable magnetostrictive materials for the flexure vibration.

Another embodiment of a magnetostrictive engine-knock sensor is illustrated in FIG. 2. A magnetostrictive flexure vibrator 11 is inserted in a schematically represented clamp 10 and has its upper and lower sides oppositely polarized, as the result of the material being bent back on itself at the free end. A coil 12 is provided near the clamp in such a way that it does not interfere with the vibrations of the flexure vibrator. Subject to that requirement, the air gap is made so small, however, that losses from stray flux are kept slight. The different polarization of the upper and lower sides of the vibrator, as already mentioned, is obtained by folding over in the middle of a strip of magnetostrictive material having a single direction of polarization before folding. Voltages are induced in the surrounding coil 12 by the deformations of the flexure vibrator 11 occurring with vibratory movement. These deformations occur primarily in the region of clamping, so that particularly large signals can be obtained if the coil is provided near the clamp.

In order to make possible accurate indications of knock vibrations, the vibration of the sensor must be prevented, after the dying down of the knock vibrations, until the next ignition spark in the engine. The flexure vibrator is therefore to be damped periodically. A definite damping can be obtained in the embodiments according to FIGS. 1 to 4 by applying to the signal coils an amplified voltage in phase opposition to the vibration signals that generates opposed changes in length in the upper and lower halves of the vibrator and thereby operates in opposition to the primarily excited flexure vibration. The opposing effect of the damping on the flexure vibration signal can be reduced, as shown in FIG. 7, for example, by having the signal coil 12 form one arm of a bridge 12,30,31,32, taking off the signal voltage at one diagonal of the bridge while supplying the damping signal to the other diagonal of the bridge, from an amplifier 33 for the flexure vibration signal, the damping signal being supplied to the bridge diagonal through a coupling capacitor 35, a periodically actuated switch 36 and an inverter 34.

The embodiment according to FIG. 3 differs from that of FIG. 2 in that the flexure vibrator 11 is split apart for a distance in the region of clamping in order to maintain reliably the opposite magnetization in the upper and lower halves of the vibrator. The manner of operation of the engine-knock sensors according to FIG. 2 and according to FIG. 3 is the same in both cases.

FIG. 4 shows an embodiment of the engine-knock sensor that makes it possible to use magnetostrictive material having no remanence. Here again, a flexure vibrator 14 is inserted in a clamp 10 and is wound with a coil 12 in the neighborhood of its clamping. At the clamping end, the flexure vibrator 14 is bent so as to form a triangle on the base of which an additional coil 15 is wound. The spreading apart is thus so increased outside of the clamping, in comparison to in the vibration region, that the provision of the coil 15 is readily feasible. The coil 15 serves to provide, by the direct current flowing through the coil, the substitution of a magnetic bias for the missing remanence. The magnetic bias can also be produced with a small permanent magnet in a further preferred embodiment of the invention, the permanent magnet being inserted between the spread-apart portions and instead of the coil.

Still another embodiment of an engine-knock sensor utilizing magnetostrictive material is shown in FIG. 5. A cavity 21 is provided in the screw head of a cylinder head screw 20, into which cavity a groove 22 communicates from the left. In this groove 22, a tongue 23 of a material having the elastic properties of a spring is inserted. A weight 24 is shiftably mounted on the tongue 23 for tuning the resonance frequency of the sensor. Near the clamping of the tongue 23, a magnetostrictive shell core 25, to which magnetic bias is applied, is inserted which is dynamically fitted to the tongue as vibrator. As is shown in detail in FIG. 6, the magnetostrictive shell core 25 has two slots 26 and 27 through which a coil 28 is wound. The cylinder head screw 20 in FIG. 5 is closed up with a covering cap 29. This cylinder head screw equipped as an engine-knock sensor can be screwed into the cylinder head of any motor into which the threads fit. The vibrations of the tongue, which for example can be made of spring steel, are picked up by the magnetostrictive shell core, which induces voltages in the coil corresponding to the deformation of the core. When the engine knocks, vibrations are produced that can be detected as an electrical signal from the coil. By the shifting of the weight 24, it is possible to change the resonance frequencies of the tongue and to fit the latter optimally to a particular internal combustion engine.

Although the invention has been described with reference to several illustrative embodiments, it will be understood that other variations and modifications are possible within the inventive concept.

We claim:

1. A sensor for detecting oscillations in an internal combustion engine resulting from engine knocks comprising a flexure vibration member of resilient material clamped at one end in a mounting affixing said end of said member to a part of an internal combustion engine which transmits engine-knock noise, said flexure vibration member having its longest dimension oriented perpendicularly to the direction of oscillatory movement of said engine part during transmission of engine-knock noise and having the improvement which consists in that:

said flexure vibration member is a strip of magnetostrictive material of originally uniform magnetostrictive polarity folded over on itself so as to provide two longitudinal adjacent regions of opposite magnetostrictive polarity and at least one coil is wound around said element for connection in an electrical circuit for detecting flexure vibrations of said flexure vibration member.

2. A sensor as defined in claim 1, in which said flexure vibration member (13,14) is split apart for a length thereof in the region of its clamping.

3. A sensor as defined in claim 2, in which an additional coil (15) is provided around said flexure vibration member (14) for magnetically biasing said flexure vibration member (14).

4. A sensor for detecting oscillations in an internal combustion engine resulting from engine knocks comprising a flexure vibration member of resilient material clamped at one end in a mounting affixing said end of said member to a part of an internal combustion engine which transmits engine-knock noise, said flexure vibration member having its longest dimension oriented perpendicularly to the direction of oscillatory movement of said engine part during transmission of engine-knock noise and having the improvement which consists in that:

said flexure vibration member is provided with a magnetostrictive element (1, 11, 13, 14, 25) and at least one coil (7, 8, 12, 28) is wound around said element for connection in an electrical circuit for detecting flexure vibrations of said flexure vibration member, and means are provided for supplying periodically to said at least one coil (7, 8, 12) of said electrical detecting circuit a signal in phase opposition to the detected signal produced by flexure vibrations of said member.

5. A sensor as defined in claim 4, in which said means for supplying said phase opposition signal are constituted so as to provide said signal from the time of dying away of engine knock noise until the next ignition spark in said engine.

6. A sensor as defined in claim 5, in which said means for said at least one coil (12) of said detecting circuit is connected so as to form an arm of a bridge (12,30,31,32) for providing the detection signal voltage across one bridge diagonal, while said phase opposition signal is supplied across the other bridge diagonal.

7. A sensor for detecting oscillations in an internal combustion engine resulting from engine knocks comprising a flexure vibration member of resilient material clamped at one end in a mounting affixing said end of said member to a part of an internal combustion engine which transmits engine-knock noise, said flexure vibration member having its longest dimension oriented perpedicularly to the direction of oscillatory movement of said engine part during transmission of engine-knock noise and having the improvement which consists in that:

said flexure vibration member is provided with a magnetostrictive element (1, 11, 13, 14, 25) and at least one coil (7, 8, 12, 28) is wound around said element for connection in an electrical circuit for detecting flexure vibrations of said flexure vibration member, and said flexure vibration member (23) consists of a material having spring elasticity and is supported in the neighborhood of its clamping by a body of magnetostrictive material about which is would a coil (28).

8. A sensor as defined in claim 7, in which a weight (24) is adjustably attached to said flexure vibration member (1,11,13,14,23) for adjusting its frequency of resonance.

9. A sensor as defined in claim 7, in which bores are provided in said flexure vibration member (1,11,13,14,23) for setting its frequency of resonance.

10. A sensor as defined in claim 7, in which said sensor is mounted and housed in a cavity (21) of the screwhead of an engine cylinder-head screw (20).

* * * * *

UNITED STATES PATENT AND TRADEMARK OFFICE
CERTIFICATE OF CORRECTION

PATENT NO. : 4,383,434

DATED : May 17, 1983

INVENTOR(S) : Hans-Joachim HAMISCH et al

It is certified that error appears in the above—identified patent and that said Letters Patent is hereby corrected as shown below:

Column 6, claim 7, line 13 "would a coil (28)" should be -- wound a coil (28) --

Signed and Sealed this

Twenty-third Day of August 1983

[SEAL]

*Attest:*

GERALD J. MOSSINGHOFF

*Attesting Officer*     *Commissioner of Patents and Trademarks*